April 20, 1937. F. C. GLADECK ET AL Re. 20,334

SCRAP BUNCH MACHINE

Original Filed Aug. 22, 1932 4 Sheets-Sheet 1

INVENTOR
Frederick C. Gladeck
BY James P. Durning
Sydney P. Prescott
ATTORNEY

April 20, 1937. F. C. GLADECK ET AL Re. 20,334

SCRAP BUNCH MACHINE

Original Filed Aug. 22, 1932 4 Sheets-Sheet 2

INVENTOR
Frederick C. Gladeck
BY James P. Running
Sydney P. Prescott
ATTORNEY

SCRAP BUNCH MACHINE

Original Filed Aug. 22, 1932 4 Sheets-Sheet 3

INVENTOR
Frederick C. Gladeck
BY James P. Dunning
Sydney J. Prescott
ATTORNEY

SCRAP BUNCH MACHINE
Original Filed Aug. 22, 1932 4 Sheets-Sheet 4
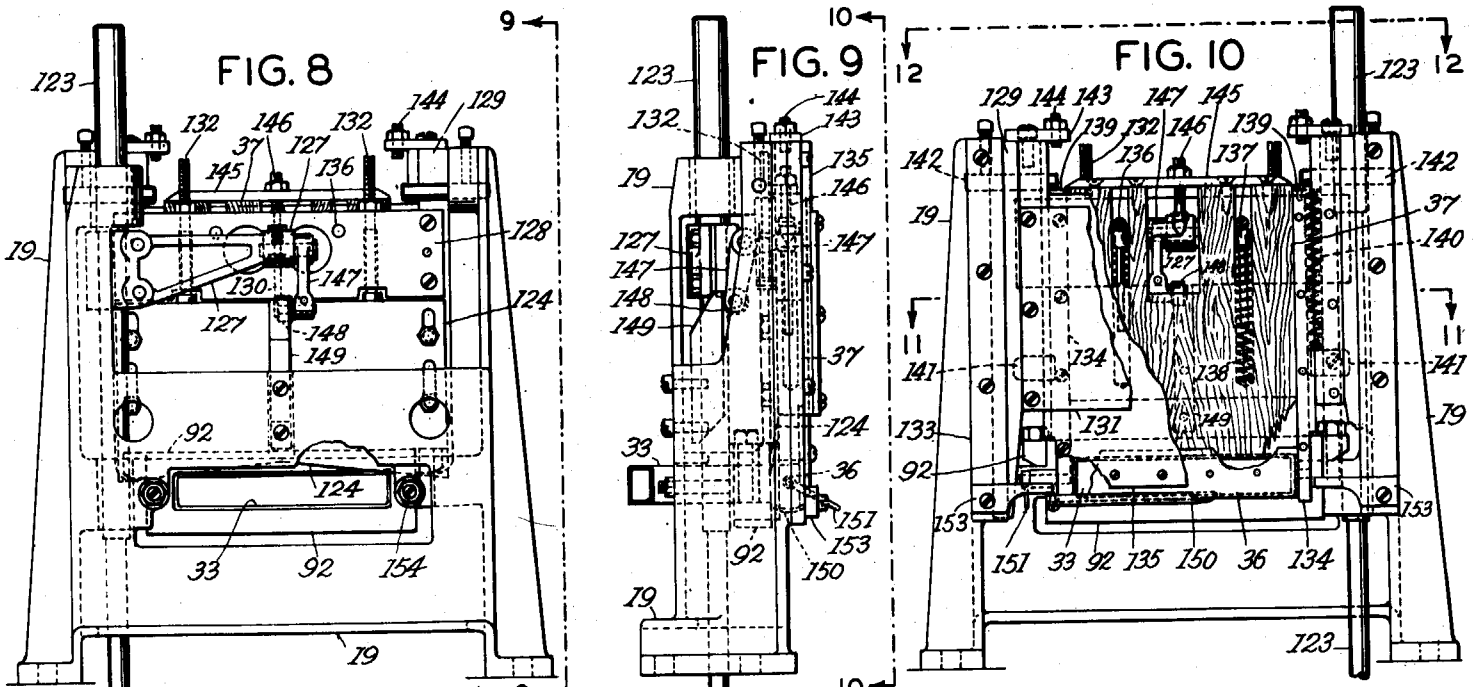
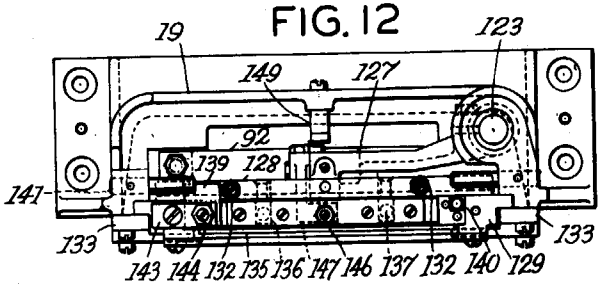
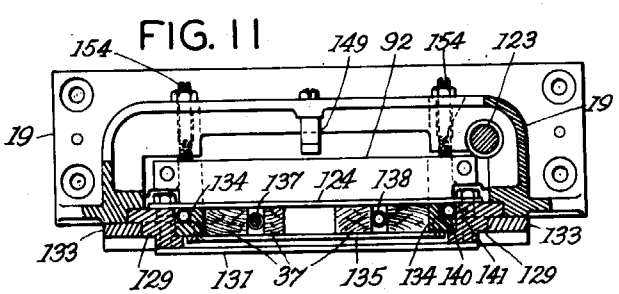
INVENTOR
Frederick C. Gladeck
BY James P. Dunning
Sydney J. Prescott
ATTORNEY Reissued Apr. 20, 1937 Re. 20,334

UNITED STATES PATENT OFFICE 20,334

SCRAP BUNCH MACHINE

Frederick C. Gladeck, Brooklyn, and James P. Durning, St. Albans, N. Y., assignors to International Cigar Machinery Company, a corporation of New Jersey Original No. 1,915,525, dated June 27, 1933, Serial No. 629,966, August 22, 1932. Application for reissue June 25, 1935, Serial No. 28,378

34 Claims. (Cl. 131—42)

This invention relates to an improvement in scrap bunch cigar machines, its main object being the production of a machine specially adapted for large scrap tobacco, the machine herein described consisting of a stationary magazine or hopper with intermittently revolving agitators, an oscillating transfer drum with a reciprocating tobacco pan, a measuring chamber having gates which open automatically to admit the tobacco delivered by the pan, a charge-compressing and measuring unit with automatic knock-out device, a charge-cutting and transfer unit, and a charge-rolling and ejecting unit. With this and other objects not specifically mentioned in view, the invention consists in certain constructions and combinations hereinafter fully described and then specifically set forth in the claims hereunto appended.

The scrap tobacco is placed in the hopper in which it is kept in loose condition by intermittently revolving agitators. Below the outlet of the hopper is placed an oscillating transfer drum in which a slidable pan is supported on a cam-operated arm. In each cycle of the machine, this drum makes one-half revolution and returns to starting position. While in the starting position, the pan ascends into the hopper and returns with a quantity of tobacco, the cam-operated knives provided on the pan being open during the ascent, and closing on reaching its uppermost position to separate the quantity of the tobacco in the pan from the mass of tobacco in the hopper. Upon the return of the pan, the transfer drum with the filled pan makes its forward half-turn during which the knives on the pan are opened by engagement with a stationary cam so that the charge can drop into the measuring chamber below, the cam-operated gates of the latter opening during the forward turn of the drum. While the drum, with the knives on the pan still open, then returns to starting position, the gates of the measuring chamber are closed and the freshly deposited loose charge is compressed by a horizontally slidable spring-tensioned plunger to the proper density determined by the adjustment of the plunger spring. The pan is designed to hold slightly more tobacco than is required for one cigar bunch, so that there is a surplus of tobacco present in the measuring chamber after the charge has been severed. When this surplus tobacco has accumulated in sufficient quantity for another cigar bunch, the motion of the transfer drum is automatically stopped for one cycle of the machine by means of linkage between the compressing plunger and a cam which operates the oscillating means of the transfer arm. This linkage requires a predetermined minimum forward stroke of the plunger to actuate the said cam; when the surplus tobacco accumulated in the measuring chamber prevents the plunger from reaching the end of its predetermined stroke, the transfer drum cam remains stationary and no more tobacco is delivered to the measuring chamber during that cycle of the machine. A charge of tobacco sufficient for one cigar bunch is severed by a cam-operated vertically reciprocating knife and is then carried downward by a vertically reciprocating transfer plunger which finally expels it. Upon the return of the transfer plunger and the charge cutting knife, a rolling pin adjustably carried by a swinging rolling arm rolls the charge into a binder previously deposited on the apron and delivers it into a holder at the end of the rolling table from which it is taken by an operator serving a nearby bunch-shaping and wrapper-applying machine.

In the accompanying drawings which form a part of this specification and on which like characters of reference indicate the same or like parts:

Fig. 8 is an enlarged end view of the charge-cutting and transfer unit, on line 8—8 of Fig. 1;

Fig. 9 is a side view of Fig. 8;

Fig. 10 is an end view on line 10—10 of Fig. 9;

Fig. 11 is a cross-section taken on line 11—11 of Fig. 10; and

Fig. 12 is a top view seen from line 12—12 of Fig. 10.

In carrying the invention into effect there is provided a hopper for holding a supply of scrap tobacco, a measuring chamber below the hopper, an oscillating transfer drum, a pan in said drum adapted to be projected into the hopper to receive a quantity of tobacco and retracted into the drum with said quantity, mechanism for oscillating said drum and actuating said pan to remove a quantity of tobacco from said hopper and deliver it to the measuring chamber, means for compressing the tobacco in said measuring chamber, means for rolling a charge of tobacco in a bunch binder, means for cutting off a charge from the tobacco in the measuring chamber and delivering it to said rolling means, and means controlled by the tobacco-compressing means for incapacitating said mechanism if there is a quantity of tobacco sufficient for more than two bunch charges in the measuring chamber, and thereafter rehabilitating said mechanism. In the best constructions contemplated the pan is provided with a pocket adapted to receive the quantity of tobacco, and knives for separating the quantity of tobacco in the pocket from the mass in the hopper, and the charge severing means includes means for compressing the charge while it is being severed, and the incapacitating and rehabilitating means includes a trip lever adapted to be operated by the tobacco compressing means, pawl means for driving the drum oscillating mechanism, and a cam piece connected to said lever for disengaging the pawl means. These various means and parts may be widely varied in construction within the scope of the claims, for the particular machine selected to illustrate the invention is but one of many possible concrete embodiments of the same. The invention, therefore, is not to be restricted to the specific construction shown and described.

Figure 1:
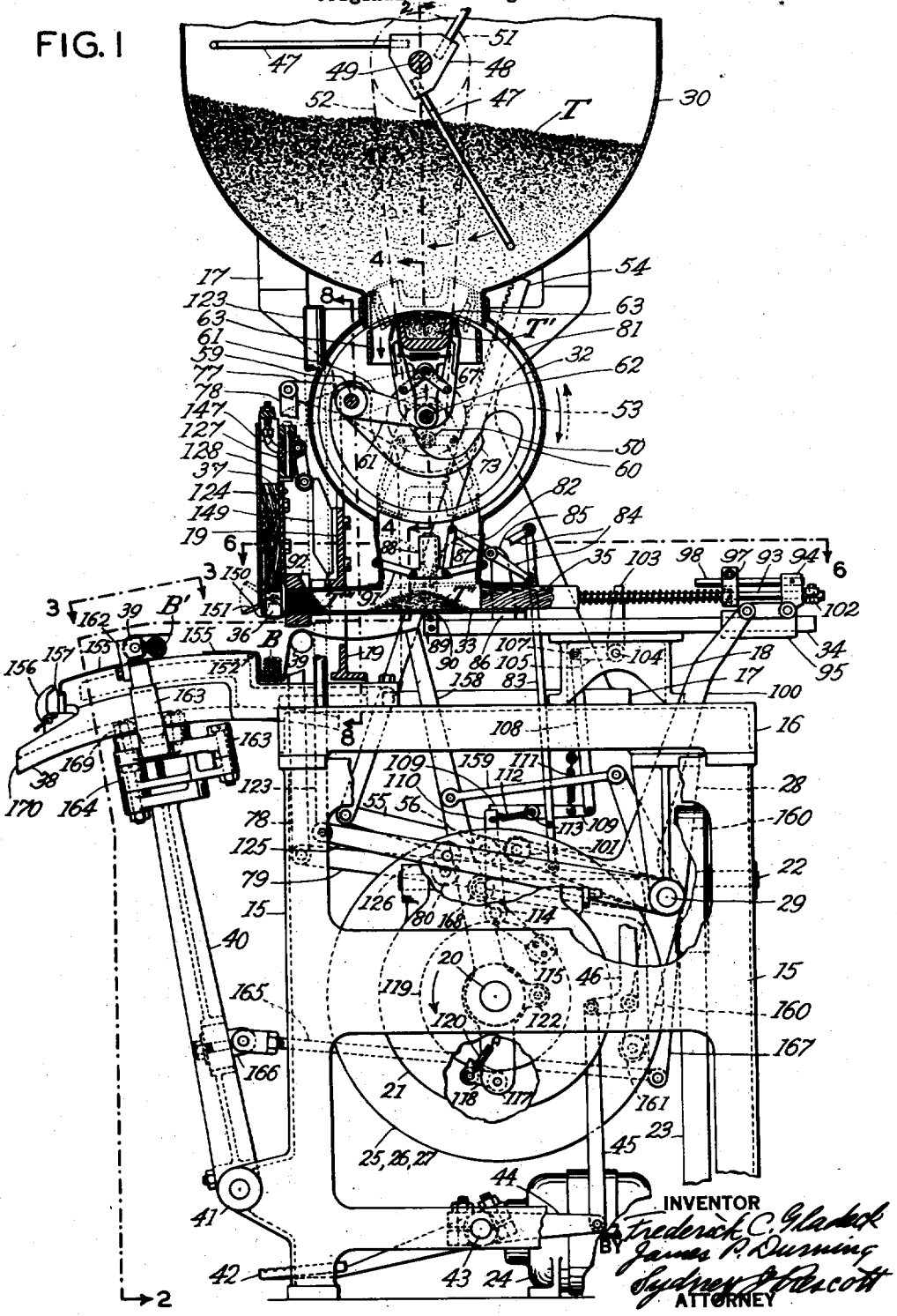
Fig. 1 is a sectional side elevation of the improved scrap bunch machine.
Figure 2:
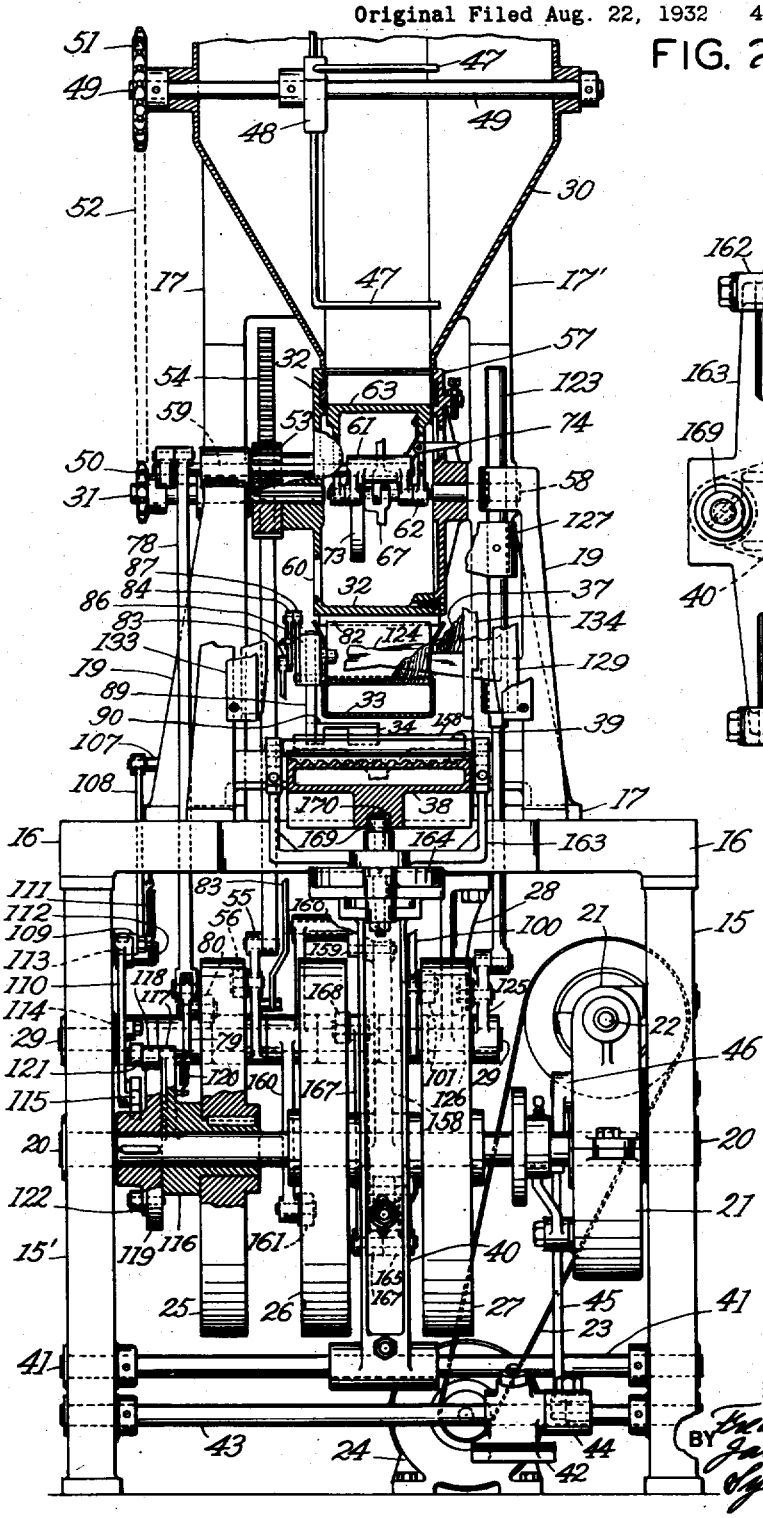
Fig. 2 is a sectional end elevation on line 2—2 of Fig. 1.

Referring now to Figs. 1 and 2, the side frames 15, 15' of the machine support a base or table 16 upon which are mounted pedestals 17, 17', a support block 18 and a pedestal frame 19. In the side frames 15 is journaled the drive shaft 20 of the machine which is driven through a worm wheel reduction gearing 21 on a shaft 22 by a belt 23 from a motor 24. The shaft 20 carries cams 25, 26 and 27. The side frames 15', in conjunction with a bearing 28 suspended from the base 16, supports a shaft 29 on which the cam levers actuated by the cams 25, 26 and 27 are fulcrumed.

The pedestals 17, 17' support the hopper 30 and carry a shaft 31 on which the horizontal transfer drum 32 is fixed. The support block 18 carries the measuring chamber 33 and the slide bar 34 for the charge-compressing plunger 35, and on the pedestal frame 19 is mounted the chamber 36, forming a continuation of the measuring chamber, and charge-cutting and vertical transfer plunger unit 37. To the base 16 is attached the rolling table 38 over which swings the rolling pin 39 which is adjustably carried by an arm 40 pivoted on a shaft 41 supported by the side frames 15. A treadle 42 on a shaft 43 in frames 15, by means of an arm 44, connecting rod 45 and bell-crank lever 46, controls the main clutch of the machine on shaft 22.

The tobacco T in hopper 30 is kept in loose condition by agitating rods 47 mounted in a block 48 on a shaft 49 supported by the hopper, the shaft 49 being intermittently driven from shaft 31 by means of sprockets 50 and 51 and chain 52, the sprocket 50 being attached to shaft 31 by a suitable device, such as a ball clutch or a pawl and ratchet, not shown, so as to turn in one direction only. The shaft 31 is alternately turned one-half revolution forward and back by means of a gear 53 engaging with a rack 54 attached to a cam lever 55 pivoted on shaft 29 and engaging cam 25 by means of roller 56. Fast on shaft 31 is the hub of the drum 32 which has the end-spider 57 turnably mounted on a stud 58 in pedestal 17'.

Figure 4:
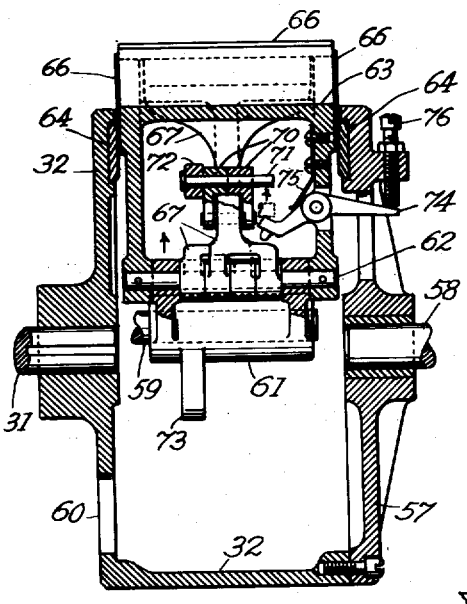
Fig. 4 is an enlarged cross-section of the charge-transfer drum, taken on line 4—4 of Fig. 1.
Figure 5:
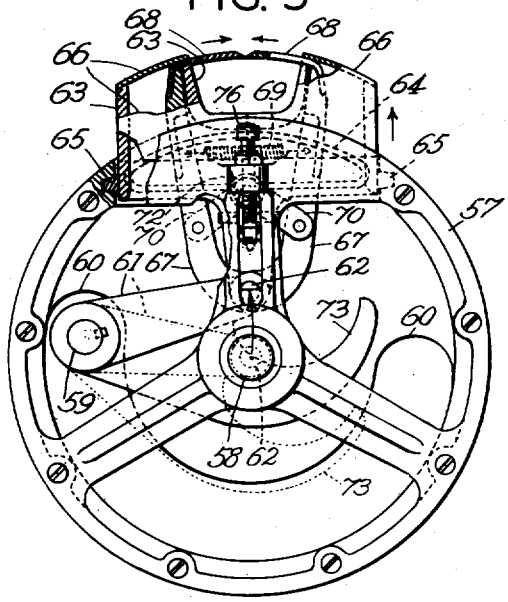
Fig. 5 is an end view of the unit shown in Fig. 4.

A shaft 59 supported in pedestal 17 and extending through a semi-circular slot 60 in the head of drum 32, within the drum carries a forked bracket 61 supporting a shaft 62, Figs. 4 and 5. To shaft 62 are attached the side arms of the pan 63 which is slidable in an opening in the drum 32, the sides of this opening being provided with packings 64 and 65. The pan 63 has a pocket provided therein adapted to receive a quantity of tobacco when the pan is projected into the hopper. The cover plates 66, which are fixed on the top of the pan, prevent tobacco on either side of the pocket, from entering the space provided for the travel of the knives 68. Pivoted on shaft 62 are arms 67 carrying the knives 68 for separating the quantity of tobacco in the pocket from the mass in the hopper, the arms 67 being normally held closed by a spring 69 connecting the same. Each of the arms 67 has a link 70 pivoted to a pin 71 carrying a roller 72 adapted to engage with a cam piece 73 on bracket 61. In a slot of one of the side arms of scoop 63 is pivoted a double lever 74 tensioned by a leaf spring 75, one arm of which lever engages with pin 71 when its other arm is arrested by a stop screw 76 in a lug on one of the arms of spider 57. The shaft 59 has a crank 77, Fig. 1, connected by a rod 78 to a cam lever 79 fulcrumed on shaft 29 and carrying a roller 80 engaging with a track of cam 25.

In the starting position of drum 32, when the pan 63 in the drum is underneath the hopper outlet, the cam lever 79 controls the crank 77, thereby projecting the pan 63 into the hopper 30. As the pan reaches its uppermost position in the hopper, the trip lever 74 is turned by engaging with stop screws 76, so that its trip arm raises the pin 71 and moves the links from their neutral position in which they separate the arms 67, thereby allowing the spring 69 to close the knives 68 of the filled pocket to separate the quantity of tobacco in the pocket from the mass in the hopper. Upon the retraction of the pan into the drum the rack 54 turns the drum 32 through one-half of a revolution, so that the pan is now in reversed position opposite the lower opening of drum housing 81. During this turning of the scoop, the roller 72 engages with the cam piece 73 which is so shaped that the pin 71 is thereby moved towards the center of the drum to a point beyond the neutral position of the links 70, thus opening the knives as shown in dotted lines in Fig. 1, the spring 69 then holding them open during the return of the drum to starting position.

In the dotted position referred to, the quantity of tobacco T' carried by the pan is dropped into the measuring chamber 33, the hinged gates 82 of which have been raised during the transfer motion of the pan by a connecting rod 83 attached to cam lever 55, the said connecting rod moving one end of a double lever 84 fulcrumed in a bearing bracket 85 fastened to a cross-piece 86 on slide bar 34, the other end of lever 84 being connected by a link 87 to a slide 88 guided by a bar 89 attached by a cross bar 90 to slide bar 34, the slide 88 having links 91 pivoted to the gate 82. (See Figs. 1, 2, 6 and 7.)

The loose quantity of tobacco T' deposited by the pan 63 into the measuring chamber 33, which is supported by the cross piece 86 and by the ledger plate 92 attached to frame 19, is compressed into the chamber 36, which forms a continuation of the measuring chamber, by the plunger 35. The latter is attached to a rod 93 sliding in a lug 94 of slide 95 mounted on slide bar 34. A spring 96 on rod 93 bears against the end of plunger 35 and is adjusted to the proper tension by a socket 97 adjustably attached to a rod 98 carried by lug 94, the tension of spring 96 regulating the density of the tobacco compressed by the plunger 35. The slide 95 is connected by a link 99 to a cam lever 100 fulcrumed on shaft 29 and having a roller 101 in engagement with cam 27. With the above construction for projecting the pan into the hopper and cutting off the quantity of tobacco in its pocket, there is no tendency for the tobacco to bridge over the hopper outlet and thus retard the delivery of the tobacco from the hopper, as in prior scrap tobacco feeds. Furthermore, any excessively large scraps projecting out from the pocket will be severed, and therefore will not impede the turning of the transfer drum in its housing.

In order to prevent scant charging of the cutting chamber in case the pan should fail to pick up a full charge, the feed is so arranged that there will always be a surplus of tobacco in the measuring chamber. For this purpose, the pocket in pan 63 is made to hold an excess of tobacco over one bunch charge, and the stroke of the plunger 35 is adjusted to such a clearance from the chamber 36 as to require at least two bunch charges of the proper density to fill said chamber and the clearance space. Thus, after the charge in the chamber 36 has been severed, there is still more than enough compressed tobacco T'' left in the measuring chamber to again fill the cutting chamber. Therefore, even when the next quantity of tobacco delivered by the pan happens to be scanty, there will be a full bunch charge. If, on the other hand, the quantities delivered are each in excess of a bunch charge, this surplus tobacco will accumulate in the measuring chamber and from time to time will prevent the plunger 35 from reaching the end of its predetermined stroke. At these times, a finger 102 attached to the end of rod 93 will fail to engage the trip lever 103 placed in its path, and thus will stop the feed drum and scoop from operating during the next cycle of the machine so that then one charge from the pan is omitted and the measuring chamber cleared from excessive tobacco accumulation.

Figure 6:
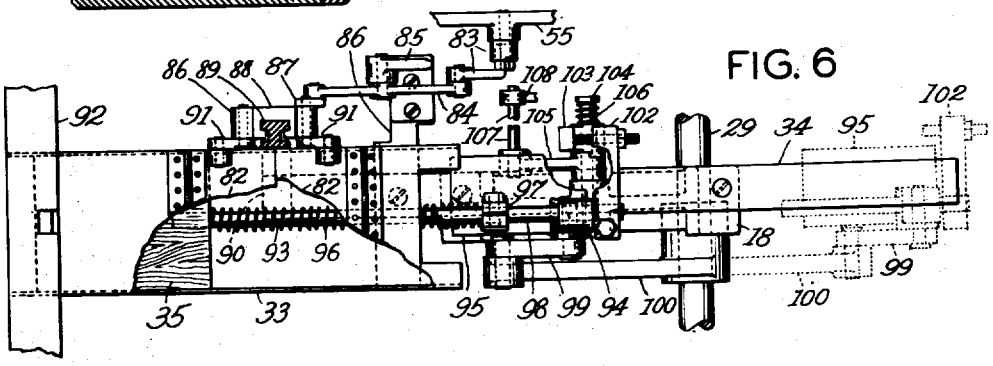
Fig. 6 is an enlarged top view of the charge-compressing unit, on line 6—6 of Fig. 1.
Figure 7:
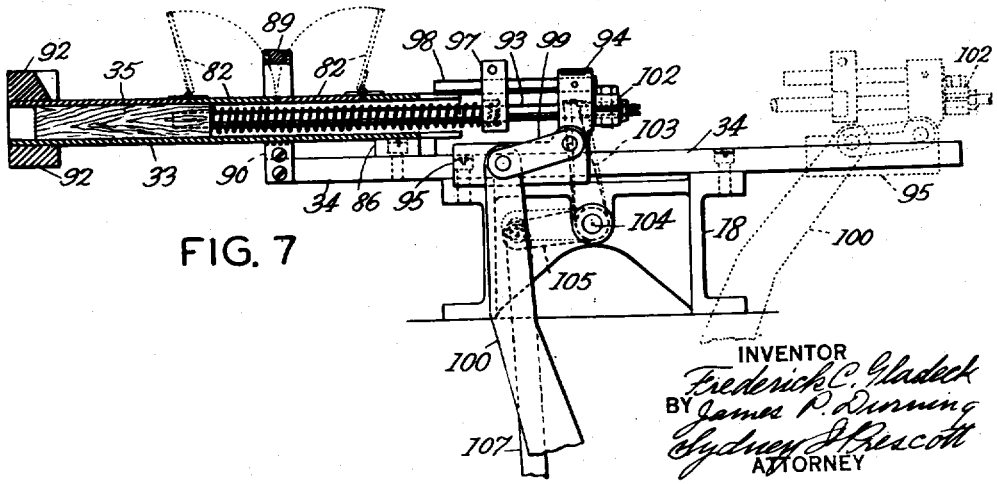
Fig. 7 is a side elevation of the unit shown in Fig. 6.

The trip lever 103, Figs. 6 and 7, is carried by a stud 104 in support block 18 on which it is held in engagement with a crank arm 105 by a spring 106. The arm 105 is connected by a cross-stud 107 and a rod 108 to one end of a horizontal double lever 109, Figs. 1 and 2, the other end of which is held in engagement with the end of a vertical double lever 110 by means of springs 111 and 112. The levers 109 and 110 are fulcrumed on studs 113 and 114, respectively, in side frame 15'. The free end of lever 110 carries a cam piece 115 having an upper and a lower cam surface adapted to engage with the driving mechanism of cam 25 which controls the motion of the feed drum rack 54 and of the pan-lever shaft 59. The cam 25 is keyed on a sleeve 116 which rides loosely on shaft 20 and has an arm 117 carrying a pawl 118 engaging with ratchet 119 fast on shaft 20, the pawl 118 being held in engagement by a spring 120. The tooth end of pawl 118 carries a roller 121, and to the face of ratchet 119 is pivoted a roller 122, both rollers being in vertical alignment with the cam piece 115.

The cam piece 115 is normally in the path of roller 121. When the plunger 35 travels its full stroke, the finger 102 engages with the lever 103 and thereby trips the lever 109, allowing the spring 112 to turn the lever 110 and thus to bring the cam piece 115 out of registration with the path of roller 121. The engagement of pawl 118 with ratchet 119 then will not be disturbed, and the cam 25 will be driven by the ratchet 119. However, when the tobacco accumulated in the measuring chamber shortens the stroke of plunger 35 so that the finger 102 will not engage with lever 103, the cam piece 115 will remain in its raised position and will cause the roller 121 to engage with it, thereby lifting the pawl 118 out of mesh with the ratchet 119, thus releasing the cam 25 and stopping the tobacco feed. Then when the finger 102 engages with lever 103, on full stroke of plunger 35, and trips the lever 109, the spring 112 turns lever 110 to bring the cam piece out of engagement with the roller 121 and restart the tobacco feed. In the tripped position of lever 110, on full stroke of plunger 35, the cam piece 115 comes into registering position with roller 122 so that the turning of ratchet 118 will engage the roller with the cam piece and reset the lever 110 into tripping position against the end of the lever 109 for the next stroke of the plunger.

When the chamber 36 has been filled by the advance of plunger 35, the reciprocating vertical rod 123 descends, thereby operating the charge-cutting knife 124 and the charge ejecting or transfer plunger 37. The rod 123 which slides in bearings of the pedestal frame 19, is actuated by a cam lever 125 fulcrumed on shaft 29 and having a roller 126 in a track of cam 27.

To the slide rod 123, Figs. 8 to 12, is clamped a bracket 127 the free end of which projects into an opening of a block 128 attached to slides 129 and is affixed thereto by a vertical pin 130. The slides 129 which are connected by a tie plate 131 carry the charge-cutting knife 124, the vertical position of which is adjusted by screws 132 held in block 28. The slides 129 fit into a recess of frame 19 in which they are guided by retaining strips 133. Into a recess of the knife slides 129 are fitted plunger slides 134 joined by a tie plate 135, and in the space between the slides 134, the knife 124 and the tie plate 135, slides the vertical charge ejecting plunger 37. Into slots provided in the latter project studs 136 carried by block 128 and engaging with pins 137 resting on coil springs 138 inserted into vertical holes formed in the body of the plunger 37.

To the tops of slides 134 are attached plates 139 resting on coil springs 140 held on blocks 141 attached to knife slides 129. In the up-position of rod 123, the springs 140 hold the plates 139 against studs 142 held in frame 19. To the tops of the knife slides 129 are fastened plates 143 carrying adjustable set screws 144 which on the down-stroke of rod 123 engage the plates 139 and depress the slides 134. The plunger 37, in a top strip 145 attached to it, carries an adjusting screw 146 which rests on one arm of a bell-crank lever 147 pivoted on bracket 127 attached to rod 123. The other arm of lever 147 carries a cam roller 148 engaging with a stationary cam piece 149 attached to frame 19.

To the bottom of the slide tie plate 135 is fastened the back of the chamber 36 in the sides of which, formed by the ends of slides 134, is pivoted the bottom gate 150 which is controlled by crank levers 151 adapted to engage with pins 152 in the rolling table, on the down-stroke of the chamber, Fig. 1, and with stop pieces 153 attached to slide guides 133 on the upward stroke. To lugs of frame 19 is fastened the ledger plate 92 for the knife 124. The ledger plate, which is horizontally adjustable by screws 154, is hollowed out to receive the delivery end of the measuring chamber 33.

As the rod 123 descends, upon a charge having been delivered to the chamber 36, the bracket 127 depresses the block 128, thereby actuating the charge-cutting knife 124. During the descent of the knife, the plunger 37 is held in place by the springs 140, the studs 136 depressing the pins 137 against the tension of the springs 138, thereby gradually compressing the charge in the vertical direction while the same is being cut. As soon as the charge is severed, the set screws 144 come into engagement with the plates 139, thereby depressing the plunger 37 and cutting chamber 36 against the pressure of springs 140, thus transferring the charge to the rolling apron below.

When the chamber 36 approaches its lowermost position, the cranks 151 engage with the pins 152 in the rolling table and thereby open the bottom chamber gate 150. By this time, the roller 148 has reached the end of the vertical portion of cam piece 149 and now enters the inclined portion, thereby turning lever 147 upon which rests the stop screw 146 of the plunger. The latter is then free to move downward in the slides 134 due to the stored-up tension of the springs 138, and thus to expel the charge from the chamber 36.

On the return stroke of rod 123, the springs 140, released by the ascent of the screws 146, raise the plunger 37, chamber 36 and knife 124 until engagement of the plates 139 with the studs 142 takes place, whereupon the plunger and chamber 36 are arrested and the knife ascends alone, the accompanying ascent of the studs 136 then permitting the pins 137 to rise, releasing the tension of the springs 138. On the upward stroke of the slides 134, the cranks 151 engage with the stops 153, thereby closing the gate 150 so that the chamber 36 is now ready to receive a new charge.

The bunch charge B, Fig. 1, delivered by the plunger 37 onto the rolling apron 155 is rolled by the rolling pin 39 into a binder laid on the apron by an operator, thereby forming the bunch B' which at the end of the rolling pin stroke is delivered into a holder or clip 156. The apron 155 is fastened to the forward end of table 38 by a strip 157 and is held in proper tension by an apron-tightener arm 158 which is pivoted on shaft 20 and actuated through a connecting rod 159, a cam lever 160 and a roller 161 by cam 26. The portion of the apron 155 on which the binder is laid, and the corresponding portion of table 38 which is hollow, are perforated and the table 38 is supplied with suction, from suitable means of well known construction not shown, which keeps the binder flat on the apron until it is rolled.

Figure 3:
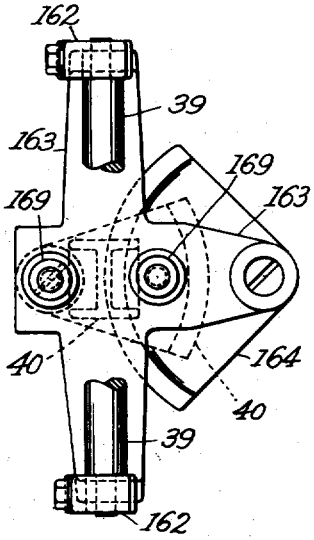
Fig. 3 is an enlarged detail view of the rolling unit seen from line 3—3 of Fig. 1.

The rolling pin 39, Figs. 1, 2 and 3, is mounted in blocks 162 carried by a yoke 163 pivoted in a swingable bracket 164 which in turn is pivoted to the rolling arm 40. By this arrangement, the angle of the rolling pin 39 can be readily adjusted for rolling straight as well as tapered bunches of various shapes. The arm 40 is actuated by a connecting rod 165 fastened to it by an adjustable pivot 166 and attached to a cam lever 167 having a roller 168 in engagement with a track of cam 26. The arm 40 is guided by rollers 169 mounted in the base of yoke 163 and running in a groove 170 in the bottom of table 38.

What is claimed is:

1. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means.

2. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means, said hopper being provided with means for intermittently agitating the tobacco therein driven from the means for oscillating said drum.

3. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means, said mechanism for oscillating the drum including a cam-operated oscillating shaft on which the drum is fixed.

4. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, means for cutting off a charge from the tobacco in said measuring chamber and delivering it to said rolling means, said drum being provided with a semicircular slot in one end thereof and an opening in its periphery, said pan being slidable in said opening and provided with a pocket in its top adapted to receive the quantity of tobacco, and knives for separating the tobacco in said pocket from the mass in the hopper, said mechanism for actuating the pan including a cam-operated oscillating shaft passing through the slot in said drum, means for supporting the pan from said shaft, arms carrying said knives, and means for relatively closing said arms to cause said knives to separate the tobacco in the pocket from the mass in the hopper and thereafter relatively opening said arms to cause the tobacco in the pocket to drop into the measuring chamber.

5. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means, said measuring chamber having cam-operated gates adapted to swing open to admit the tobacco delivered from the pan and thereafter close while the tobacco in the measuring chamber is being compressed.

6. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means, said tobacco compressing means including a plunger disposed in said measuring chamber, a cam-operated slide, a socket adjustably supported from said slide, a rod carrying said plunger and passing through said socket and slide, and a spring mounted on said rod and interposed between said plunger and socket.

7. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means, said charge severing means including mechanism for compressing the charge while it is being severed.

8. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means, said charge severing and delivering means including a pair of knife slides, a charge cutting knife carried by said slides, means for reciprocating said knife slides, a pair of plunger slides resiliently supported on said knife slides, a charge ejecting plunger, a bottom gate pivoted on said plunger slides, and means for depressing said charge ejecting plunger and swinging open said bottom gate to eject the severed charge into said rolling means.

9. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means, said rolling means including a rolling table having a longitudinal groove in its bottom, a rolling apron having one end fastened to the front end of said table, a cam-operated apron-tightener arm to which the other end of said apron is fastened, a cam-operated rolling arm, a yoke pivotally adjustable on the rolling arm and provided with rollers running in said groove, and a bunch roller mounted in said yoke.

10. In a machine for making scrap bunches the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means, said pan having a capacity in excess of one bunch charge and the capacity of the measuring chamber requiring at least two bunch charges of the proper density to fill it while the tobacco therein is compressed, whereby there is sufficient tobacco for another bunch charge left in the measuring chamber after the charge has been severed so that the delivery of a scant quantity of tobacco by the pan will not affect the operation of the machine.

11. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, means for cutting off a charge from the tobacco in said measuring chamber and delivering it to said rolling means, and means controlled by said tobacco compressing means for incapacitating said mechanism if there is a quantity of tobacco sufficient for more than two bunch charges of the desired density in the measuring chamber, and thereafter rehabilitating said mechanism.

12. In a machine for making scrap bunches, the combination with a hopper for holding a supply of scrap tobacco, of a measuring chamber below said hopper, an oscillating transfer drum, a pan in said drum adapted to be projected into said hopper to receive a quantity of tobacco and then retracted into said drum with said quantity, mechanism for oscillating said drum and actuating said pan to remove a quantity of tobacco from said hopper and deliver it to said measuring chamber, means for compressing the tobacco in said measuring chamber, means for rolling a charge of tobacco in a bunch binder, means for cutting off a charge from the tobacco in said measuring chamber and delivering it to said rolling means, and means controlled by said tobacco compressing means for incapacitating said mechanism when there is a quantity of tobacco sufficient for more than two bunch charges in the measuring chamber, and thereafter rehabilitating said mechanism, said incapacitating and rehabilitating means including a trip lever, pawl means for driving said mechanism, and a cam piece connected to said lever for disengaging said pawl means.

13. The combination with a hopper for holding a supply of scrap tobacco, of an oscillating transfer drum, a tobacco pan in said drum adapted to be projected into said hopper to receive a quantity of tobacco and then retracted into said drum with said quantity, and means for oscillating said drum and actuating said pan to remove a quantity of tobacco from said hopper.

14. The combination with a hopper for holding a supply of scrap tobacco, of an oscillating transfer drum, a tobacco pan in said drum adapted to be projected into said hopper to receive a quantity of tobacco and then retracted into said drum with said quantity, and means for oscillating said drum and actuating said pan to remove a quantity of tobacco from said hopper, said hopper being provided with means for intermittently agitating the tobacco therein driven from the means for oscillating said drum.

15. The combination with a hopper for holding a supply of scrap tobacco, of an oscillating transfer drum, a tobacco pan in said drum adapted to be projected into said hopper to receive a quantity of tobacco and then retracted into said drum with said quantity, and means for oscillating said drum and actuating said pan to remove a quantity of tobacco from said hopper, said means for oscillating the drum including a cam-operated oscillating shaft on which the drum is fixed.

16. The combination with a hopper for holding a supply of scrap tobacco, of an oscillating transfer drum, a tobacco pan in said drum adapted to be projected into said hopper to receive a quantity of tobacco and then retracted into said drum with said quantity, and means for oscillating said drum and actuating pan to remove a quantity of tobacco from said hopper, said drum being provided with a semi-circular slot in one end thereof and an opening in its periphery, said pan being slidable in said opening and provided with a pocket in its top adapted to receive a quantity of tobacco and knives for separating the tobacco in said pocket from the mass in said hopper, and said means for actuating the pan including a cam-operated oscillating shaft passing through the slot in said drum, means for supporting the pan from said shaft, arms carrying said knives, and means for relatively closing said arms to cause said knives to separate the tobacco in said pocket from the mass in the hopper and thereafter relatively separating said arms to cause the tobacco to fall out of said pocket.

17. The combination with an oscillating transfer drum, of a pan in said drum adapted to be projected from said drum to receive a quantity of tobacco and then retracted into said drum with said quantity, and mechanism for oscillating said drum and actuating said pan.

18. The combination with an oscillating transfer drum, of a pan in said drum adapted to be projected from said drum to receive a quantity of tobacco and then retracted into said drum with said quantity, mechanism for oscillating said drum and actuating said pan, said drum being provided with a semi-circular slot in one end thereof and an opening in its periphery, said pan being slidable in said opening and provided with a pocket in its top adapted to receive a quantity of tobacco, knives for separating the tobacco in said pocket from the mass in said hopper, said mechanism for actuating the pan including a cam-operated oscillating shaft passing through the slot in said drum, means for supporting the pan from said shaft, arms carrying said knives, and means for relatively closing said arms to cause said knives to separate the tobacco in the pocket from the mass in the hopper and thereafter relatively separating said arms to cause the tobacco to fall out of said pocket.

19. The combination with a transfer drum, of means for oscillating said drum, said means including a shaft on which said drum is fixed, a gear fixed on said shaft, a rack meshing with said gear, a cam lever connected to said rack, a drive shaft, a sleeve loosely mounted on said drive shaft, a cam fixed on said sleeve and actuating said cam lever, a ratchet fast on said drive shaft, a spring-pressed pawl on said sleeve engaging said ratchet, a trip lever, and a cam piece connected to said trip lever and adapted to disengage said pawl from the ratchet when the trip lever is operated.

20. The combination with a tobacco measuring chamber, of means for compressing the tobacco in said measuring chamber, said measuring chamber being provided with a hinged gate adapted to swing open to admit tobacco, means for swinging the gate open, and means controlled by said tobacco compressing means for rendering said gate opening means inoperative when there is a quantity of tobacco sufficient for more than two bunch charges of the desired density in said chamber.

21. The combination with a measuring chamber adapted to receive tobacco, of means for severing a charge from the tobacco in said chamber, said charge severing means including a pair of knife slides, a charge cutting knife carried by said knife slides, means for reciprocating said knife slides, a pair of plunger slides resiliently supported on said knife slides, a charge ejecting plunger, a gate pivoted on said plunger slides, and means for depressing said charge ejecting plunger and swinging open said gate to eject the severed charge.

22. The combination with a transfer drum provided with an opening in its periphery, of a pan slidably mounted in said opening, and means for projecting said pan from the opening to receive a charge of tobacco and retracting it into the drum with the charge.

23. The combination with a hopper holding a supply of scrap tobacco, of a transfer drum underlying the outlet opening of the hopper, a tobacco measuring chamber, means on said drum for receiving a quantity of tobacco from the hopper and delivering it to the measuring chamber, and a drum housing enclosing said drum and provided with an opening overlying the measuring chamber, said chamber being provided with a pair of gates hinged thereon and adapted to be opened to admit tobacco to the chamber, and means for swinging said gates open into juxtaposition with the drum housing adjacent said opening to guide the tobacco to the measuring chamber.

24. The combination with a trip lever, of means for compressing tobacco, said means including a plunger, a cam-operated slide, a socket supported from said slide, a rod carrying said plunger and passing through said socket and slide, a spring mounted on said rod and interposed between the plunger and socket, and a finger on said rod adapted to operate the trip lever.

25. Means for rolling a charge of tobacco in a bunch binder comprising a rolling table having a longitudinal groove in its bottom, a rolling apron having one end fastened to the front end of said table, a cam-operated apron-tightener arm to which the other end of said apron is fastened, a cam-operated rolling arm, a yoke pivotally adjustable on the rolling arm and provided with rollers running in said groove, and a bunch roller mounted in said yoke.

26. In a machine for making scrap bunches, the combination with a hopper for holding a supply of scrap tobacco, of a measuring chamber below said hopper, a rotatable pocketed transfer drum adapted to receive a quantity of tobacco, mechanism for intermittently imparting annular motion to said drum to remove a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means.

27. In a machine for making scrap bunches, the combination with a hopper for holding a supply of scrap tobacco having an opening in its lower portions, of a measuring chamber below said hopper, a transfer member having a to and fro motion, said member adapted to coact with said hopper to receive a quantity of tobacco greater than that needed for one bunch from said opening, mechanism for imparting said to and fro motion to said member to receive a quantity of tobacco from said hopper and deliver it to said measuring chamber, means for compressing the tobacco in said measuring chamber, means for rolling a charge of tobacco in a bunch binder, and means for cutting off a charge from the tobacco in said measuring chamber and delivering it to said rolling means.

28. In a machine for making scrap bunches, the combination with a hopper for holding a supply of scrap tobacco having an opening in its lower portions, of a measuring chamber below said hopper, a transfer member having a to and fro motion, said member adapted to coact with said hopper to receive a quantity of tobacco greater than that needed for one bunch from said opening, mechanism for imparting said to and fro motion to said member to receive a quantity of tobacco from said hopper and deliver it to said measuring chamber, means for compressing the tobacco in said measuring chamber, means for rolling a charge of tobacco in a bunch binder, means for cutting off a charge from the tobacco in said measuring chamber and delivering it to said rolling means, and means actuated by said compressing means controlling the operation of said member to prevent the accumulation in said measuring chamber of more than a predetermined quantity of tobacco.

29. In a machine for making scrap bunches, the combination with a hopper for holding a supply of scrap tobacco, of a measuring chamber below said hopper, a moving transfer member adapted to be moved to said hopper to receive a quantity of tobacco, and mechanism for moving said member to receive a quantity of tobacco from said hopper and to deliver it to said measuring chamber, means for compressing tobacco in said measuring chamber, means for rolling a charge of tobacco in a bunch binder, means for cutting off a charge from the tobacco in said chamber, and means controlled by said tobacco compressing means for incapacitating said mechanism if there is more than a predetermined quantity of tobacco in said chamber.

30. In a machine for making scrap bunches, the combination with a hopper for holding a supply of scrap tobacco, of a measuring chamber below said hopper, a rotatable pocketed transfer member adapted to receive a quantity of tobacco, mechanism for imparting annular motion to said member to deliver said quantity to the measuring chamber, means for compressing the tobacco in said measuring chamber, means for rolling a charge in a bunch binder, means for separating a charge from the tobacco in said chamber and delivering it to said rolling means, and means controlled by said tobacco compressing means cooperating with said transfer member to prevent delivery of said quantity of tobacco by said member if there is more than a predetermined quantity of tobacco in the measuring chamber, and means for thereafter rehabilitating said transfer.

31. The combination with a hopper for holding a supply of scrap tobacco having an opening in its lower portion, a pocketed tobacco transfer movable to said opening to receive a quantity of tobacco, and means for moving said transfer away from said opening to remove a quantity of tobacco from said hopper, opposed jaws travelling with said transfer and movable into said opening, and means operating said jaws relative to said transfer to close on the tobacco between the mass in the hopper and the tobacco in said pocket, and thereafter relatively separating said jaws to cause the tobacco to fall out of said pocket.

32. In a machine for making scrap bunches, the combination with a hopper for holding a supply of scrap tobacco, of a measuring chamber below said hopper, a movable transfer member, a pocket in said member adapted to be moved into said hopper to receive a quantity of tobacco, mechanism for moving said member and pocket to deliver said quantity to said measuring chamber, means for compressing the tobacco in said measuring chamber, means for rolling a charge of tobacco in a bunch binder, and means for cutting off a charge from the tobacco in said measuring chamber and delivering it to said rolling means, and separating elements for separating the tobacco in said pocket from the mass in the hopper, arms carrying said elements, and means for relatively closing said arms to cause said elements to separate the tobacco in the pockets from the mass in the hopper and thereafter relatively opening said arms to permit the tobacco in the pocket to drop into the measuring chamber.

33. The combination with a tobacco charge measuring chamber for cigar machines, said measuring chamber being provided with a hinged gate, means for swinging said gate to open and closed positions, a tobacco transfer for intermittently delivering a quantity of tobacco past said open gate into said chamber, means for compressing the tobacco in the chamber when the gate is closed, and mechanism controlled by said compressing means for preventing delivery of tobacco by said transfer when there is more than a predetermined quantity of tobacco in said chamber.

34. The combination with a measuring chamber adapted to receive tobacco, of means for severing a charge from the tobacco in said chamber and transferring the severed charge, said severing and transferring means including a reciprocable support movable transversely of said chamber, a knife carried by said support, means for reciprocating said support, charge retaining parts mounted on said support for retaining the severed charge and carrying it with said support, a charge ejecting plunger mounted on said support for relative movement thereon, and means coacting with said parts and acting to move said plunger relative to said support to eject the charge.

FREDERICK C. GLADECK.
JAMES P. DURNING.